Oct. 26, 1943.  L. S. WOOD  2,332,961
DUMP VEHICLE CONSTRUCTION
Filed Nov. 7, 1941  2 Sheets-Sheet 1
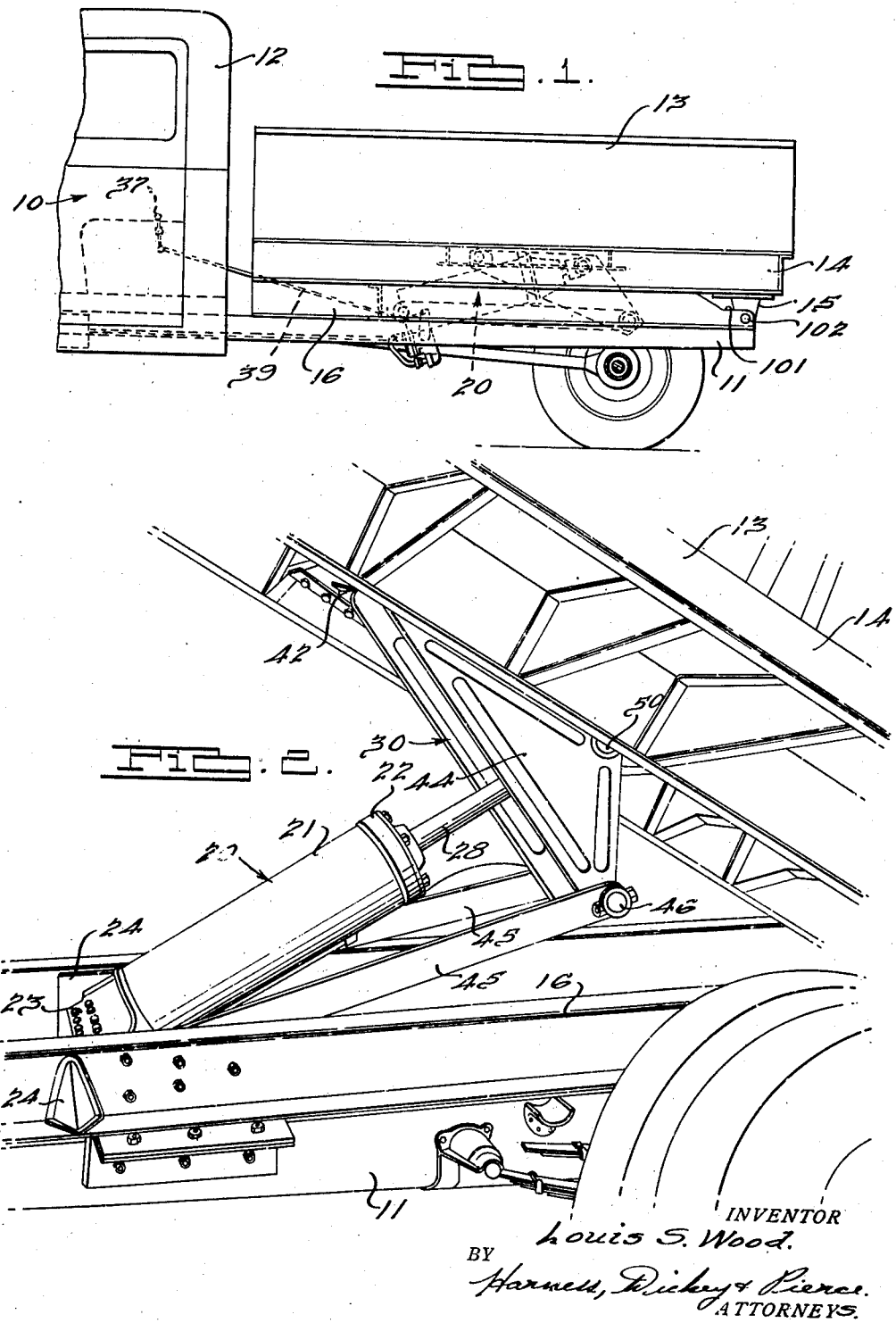
INVENTOR
Louis S. Wood.
BY Harness, Dickey & Pierce.
ATTORNEYS.

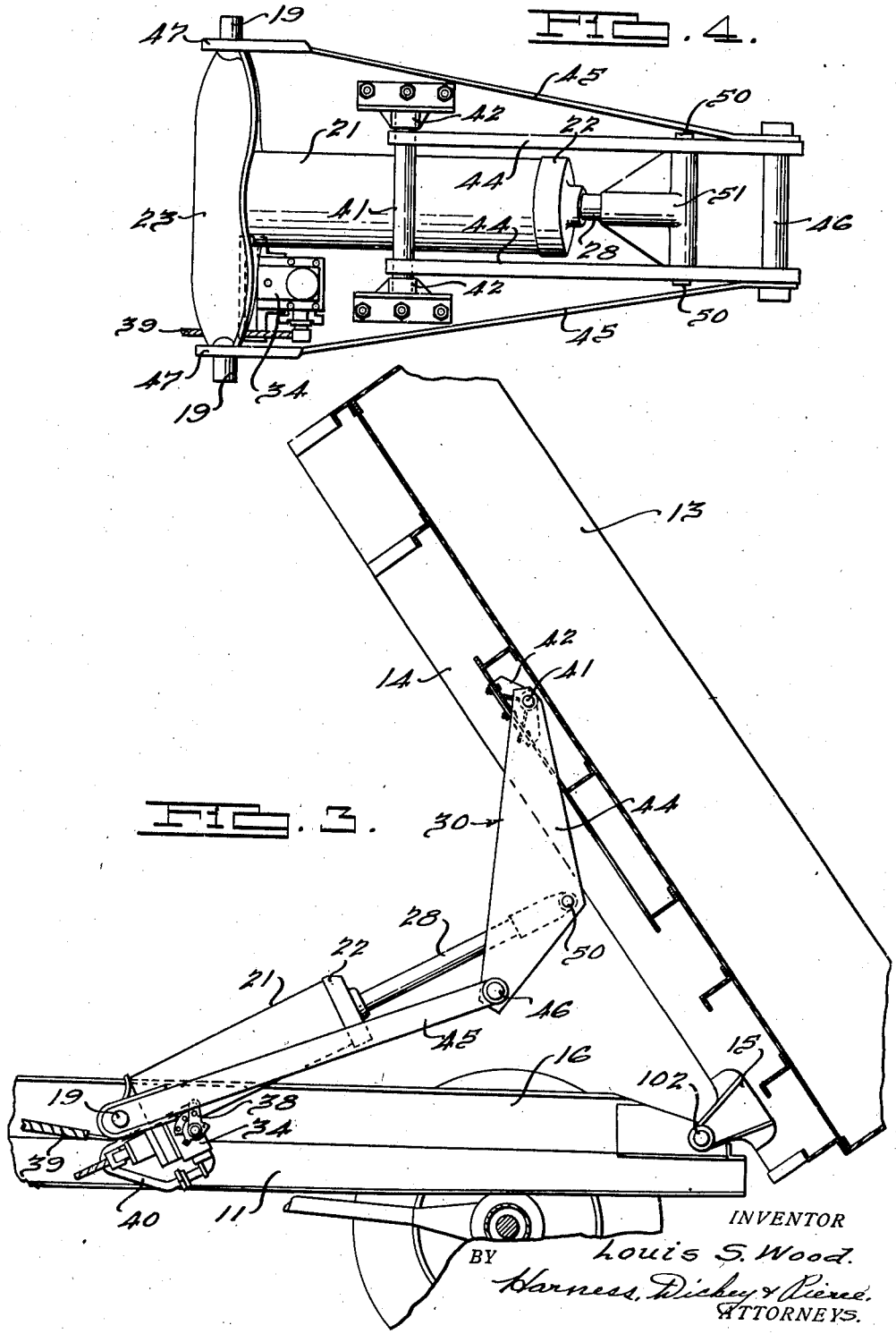

Patented Oct. 26, 1943

2,332,961

UNITED STATES PATENT OFFICE 2,332,961

DUMP VEHICLE CONSTRUCTION

Louis S. Wood, Grosse Pointe Farms, Mich., assignor to Gar Wood Industries, Inc., Detroit, Mich., a corporation of Michigan Application November 7, 1941, Serial No. 418,115

5 Claims. (Cl. 298—22)

The present invention relates to hydraulic hoist constructions for use on dump vehicles and is particularly directed to improvements over the structure disclosed and claimed in the Louis S. Wood Patent No. 2,226,213, granted December 24, 1940.

One of the primary objects of the present invention is to provide improvements in hoisting devices of the type mentioned in which the lifting effort is confined within a self-contained hoist assembly and in which there is a minimum stress on the vehicle chassis frame throughout the hoisting stages.

A further object of the invention is to provide improvements in devices of the type mentioned in which the hydraulic hoist is connected to the dump body and to the chassis in such a way that at all stages of dumping operation reaction forces are present which reduce the direct force of the hoist at the pivot point of the hoist with the body, particularly at the initial stages of dumping when the load on the hoist pivot point is greatest.

Other objects of the invention will become apparent from the following specification, the drawings relating thereto and from the claims hereinafter set forth.

In the drawings in which like numerals are used to designate like parts in the several views throughout:

Figure 1 is a partial side elevational view of a dump truck, or like vehicle, showing in dotted lines the hydraulic hoist and associated mechanism embodying features of the present invention;

Fig. 2 is a partial perspective view of a portion of the truck with the body in a partially raised position and showing the hoisting mechanism for raising the body;

Fig. 3 is a partial side view partly in section of the rear portion of the truck and showing the body raised to substantially its highest position; and Fig. 4 is a top plan view of the hoist mechanism of the present invention.

In the embodiment of the invention shown in the drawings, a dump truck of more or less conventional construction is generally indicated at 10, having a driver's cab 12 and a body 13 supported thereon. The body 13 has longitudinally extending body members 14 on the under side of the floor thereof, each of which is provided at its rear end with a depending bracket 15. The chassis 11 is provided with longitudinally extending sill members 16 which underlie the members 14. The members 16 have rearwardly extended plate members 101 welded thereto; and the brackets 15 are pivotally connected to such plates by suitable pivot pins 102. The members 14 are arranged to rest upon the upper portions of sills 16 when the body 13 is in its lowermost position. The body 13 is provided with transversely extending bracing members which are welded to the members 14 at spaced intervals therealong. Transversely extending members are also welded to the members 16 at spaced intervals therealong to brace the same.

In order to raise and lower the body about the pivots 102, an hydraulic hoisting device, generally indicated at 20, is provided. Such hoisting device per se may comprise standard or conventional hydraulic cylinder and piston assemblies, and in the embodiment shown, comprising a cylinder 21 having an end cap 22 at its upper or rearwardly projecting end. A transversely extending member 23 which projects outwardly upon the sides of the cylinder 20 is welded to the lower end thereof and serves to mount the cylinder 21 to the member 16 mounted on the chassis 11. Stub shafts 19 are fixed to the ends of the transverse member 23 and are pivotally received within suitable bearings 24 which are fixed to the plate member 16 for pivotally mounting the cylinder 21 with respect thereto.

A piston is reciprocably disposed within the cylinder 21 and has a piston rod 28 which extends through the end cap 22. A suitable packing element is disposed within the opening through the cap 22 in surrounding relation to the rod 28 in the usual way.

A conventional gear pump 34 is mounted through a suitably mounted plate to the member 23 and may be mounted on either side of the cylinder, depending upon the convenient connection for the power take-off. The pump 34 is the conventional construction and is intended to be driven by means of a flexible shaft which may be suitably connected to the power take off box of the vehicle transmission in the usual way. The pump 34 may be controlled from the driver's cab in the usual way by means of an operating lever 37 which is connected to the control lever 38 on the pump through a cable 39. By properly positioning the control lever, the pump 34 is actuated to force fluid under pressure through the conduit 40 into the lower end of the cylinder 21. This results in the upward movement of the piston rod 28 which causes dumping of the body through a connection which will be described in detail hereinafter. Movement of the lever 38 to the other side of its neutral position results in reversing the action and causes a lowering of the body.

A leverage mechanism generally indicated at 30, is provided for pivotally connecting the rod 28 to the body. This leverage mechanism includes a plurality of linkage members which are so disposed relative to each other and which are so connected to the chassis frame and to the body that reaction forces are set up which reduce the compression stresses through the cylinder 21 and piston 28 throughout the stages of dumping.

The linkage mechanism 30 comprises an upward linkage member 44 formed of a pair of spaced members which are generally triangular in shape. The forward ends of the members 44 are pivotally connected to the under side of the body 13 through a pivot rod 41. The ends of such pivot rod are mounted within bearing brackets 42 which are secured to the under side of the body 13. The leverage members 44 are thus pivotally connected to the body 13 through the pivot 41.

The piston rod 28 is pivotally connected to the members 44 between the ends thereof by means of a pivot shaft 50 which is pivotally received through a transverse opening in a mounting member 51 secured to the upper end of the piston rod 28 so that the piston rod 28 is pivotally connected to the members 44 intermediate the ends thereof.

The leverage mechanism also includes other linkage members 45 which are pivotally connected to the other ends of the members 44 by means of a pivot shaft 46. The members 45 extend in substantially the same direction as the cylinder 21 and the rod 28 and the opposite ends of the members are pivotally connected to the stub shafts 19. Thus, the distance between the pivots 19 and 46 of the linkage members 45 is fixed throughout the hoisting stages from the very beginning to the end thereof.

During dumping, power is applied to the lower end of cylinder 21 and the cylinder 21 and piston rod 28 are in compression. From the very beginning of hoisting, the rings 45 are in tension. Since there is a common means, namely, the pivotal shafts 19, which connects the cylinder 21 and the links 45 to the chassis, it will be appreciated that there is a reaction force set up by the links 45 at the pivot pins 19. Such reaction force tends to counterbalance the compression force of the cylinder 21, thereby reducing the effective compression force of such cylinder. Since the link 45 is, in effect, of fixed length between pivots 19 and 46, such reaction force is present throughout the dumping stages and, particularly, at the initial stages when the lifting force is greatest.

What is claimed is:

1. Apparatus for tilting the body of a dump vehicle comprising, in combination, a vehicle chassis, a body pivotally connected to said chassis, a hoisting device having one end pivotally connected to said chassis and including a reciprocable element, an elongated lever element having one end thereof pivotally connected to said body and pivotally connected to said reciprocal element at a fixed position intermediate the ends of said lever element, an elongated linkage member having one end thereof pivotally connected to the other end of said lever element at a fixed position on said linkage and lever elements and having its other end pivotally connected to said chassis forward of the pivotal connection of the linkage member with the lever element, the pivotal connections adjacent the ends of said linkage member being of a predetermined, fixed distance therebetween, said linkage member extending towards said lever element in substantially the same direction as said reciprocable element, and means for reciprocating said reciprocable element to tilt said body with respect to said chassis.

2. Apparatus for tilting the body of a dump vehicle comprising, in combination, a truck chassis, a body pivotally connected to said chassis, an hydraulic hoisting device including a cylinder, means pivotally connecting one end of said cylinder to said chassis, a reciprocable element operatively connected with said cylinder, an elongated lever element having one end thereof pivotally connected to said body, means pivotally connecting one end of said reciprocable element to said lever element at a fixed position intermediate the ends thereof, an elongated linkage element having one end thereof pivotally connected to said chassis through said first main means, the other end of said linkage element being pivotally connected to the other end of said lever element at a fixed position on said linkage and lever elements, the pivotal connections between the ends of said linkage element being of predetermined, fixed distance therebetween, and means for reciprocating said reciprocable element to tilt said body with respect to said chassis.

3. Apparatus for tilting the body of a dump vehicle comprising, in combination, a vehicle chassis, a body pivotally connected to said chassis, an hydraulic hoisting device including a cylinder, a reciprocable power element operably associated with said cylinder, an elongated lever element having one end thereof pivotally connected to said body, means pivotally connecting one end of said reciprocable element to said lever element at a fixed position intermediate the ends thereof, an elongated linkage element having one end thereof pivotally connected to the other end of said lever element at a fixed position on said linkage and lever elements, and common means pivotally connecting said cylinder and the other end of said linkage element to said chassis, the construction and arrangement of said cylinder, said linkage element and said common means with respect to each other being such that the forces of said cylinder and said linkage element on said common means react against each other throughout the dumping operation.

4. Apparatus for tilting the body of a dump vehicle comprising, in combination, a vehicle chassis, a body pivotally connected to said chassis, an hydraulic hoisting device including a cylinder, a reciprocable power element operably associated with said cylinder, an elongated lever element having one end thereof pivotally connected to said body, means pivotally connecting one end of said reciprocable element to said lever element at a fixed position intermediate the ends thereof, an elongated linkage element having one end thereof pivotally connected to the other end of said lever element at a fixed position on said linkage and lever elements, and common means pivotally connecting said cylinder and the other end of said linkage element to said chassis, the construction and arrangement of said cylinder, said linkage element and said common means with respect to each other being such that upon application of power to said cylinder, said cylinder and reciprocable element are in compression and said linkage element is in tension so that the forces of said cylinder and said linkage element on said common means react against each other throughout the dumping of said body.

5. Apparatus for tilting the body of a dump vehicle comprising, in combination, a vehicle chassis, a body pivotally connected to said chassis, a hoist device having one end pivotally connected to said chassis and including a reciprocable element, an elongated lever element having one end thereof pivotally connected to said body and pivotally connected to said reciprocable element at a fixed position intermediate the ends of said lever element, an elongated linkage member having one end thereof pivotally connected to the other end of said lever element and having its other end pivotally connected to said chassis forward of the pivotal connection of the linkage member with the lever element, said elongated linkage member being so positioned and connected with the chassis and with the lever element as to be in tension during the hoisting of the body, the pivotal connections adjacent the ends of said linkage member being of a predetermined fixed distance therebetween, said linkage member extending toward said lever element in substantially the same direction as said reciprocable element, and means for reciprocating said reciprocable element to tilt said body with respect to said chassis.

LOUIS S. WOOD.